(12) United States Patent
Corso et al.

(10) Patent No.: US 11,187,627 B2
(45) Date of Patent: Nov. 30, 2021

(54) PRESSURE CONTROLLED FLUID SAMPLER AND METHOD

(71) Applicant: CorSolutions LLC, Groton, NY (US)

(72) Inventors: Thomas N. Corso, Groton, NY (US); Colleen K. Van Pelt, Groton, NY (US)

(73) Assignee: CORSOLUTIONS LLC, Groton, NY (US)

( * ) Notice: Subject to any disclaimer, the term of this patent is extended or adjusted under 35 U.S.C. 154(b) by 0 days.

(21) Appl. No.: 15/494,060

(22) Filed: Apr. 21, 2017

(65) Prior Publication Data

US 2017/0307482 A1    Oct. 26, 2017

Related U.S. Application Data

(60) Provisional application No. 62/326,386, filed on Apr. 22, 2016.

(51) Int. Cl.
*G01N 1/14* (2006.01)
*G01N 35/08* (2006.01)
(Continued)

(52) U.S. Cl.
CPC .............. *G01N 1/14* (2013.01); *G01N 35/08* (2013.01); *B01L 3/0293* (2013.01);
(Continued)

(58) Field of Classification Search
CPC .............. G01N 1/14; G01N 2001/1454; G01N 2001/1445; G01N 2001/1463;
(Continued)

(56) References Cited

U.S. PATENT DOCUMENTS 3,955,436 A * 5/1976 Tucker ...................... G01N 1/10
73/864.23
4,478,095 A * 10/1984 Bradley ............. G01N 35/1079
422/64

(Continued)

FOREIGN PATENT DOCUMENTS

EP        0475533 A2    3/1992

OTHER PUBLICATIONS

International Search Report and Written Opinion, Form PCT/ISA/220, International Application No. PCT/US2017/028901, pp. 1-14, dated Jul. 25, 2017.

*Primary Examiner* — Robert R Raevis
(74) *Attorney, Agent, or Firm* — Bond Schoeneck & King, PLLC; Joseph M. Noto

(57) ABSTRACT

A fluid sampler system includes a fluidic head including a gas aperture capable of communication with a pressurized gas source, a liquid conduit capable of communication with a sample reservoir, and a seal capable of forming a compression seal to the sample reservoir when gas pressure is applied to the sample reservoir through the gas aperture and capable of displacing a portion of the sample through the liquid conduit; and a positioning apparatus capable of positioning the fluidic head and the sample reservoir in communication with one another. A method for providing an aliquot of sample, includes forming a releasable compression seal to a reservoir including a liquid sample; pressurizing the reservoir with compressed gas; displacing an aliquot of the sample from the reservoir; and transferring the displaced aliquot of the sample to a location.

9 Claims, 13 Drawing Sheets

(51) Int. Cl.
*B01L 3/02* (2006.01)
*G01N 35/10* (2006.01)

(52) U.S. Cl.
CPC .. *B01L 2400/0487* (2013.01); *G01N 35/1016* (2013.01); *G01N 2001/1427* (2013.01); *G01N 2001/1445* (2013.01)

(58) Field of Classification Search
CPC .............. G01N 35/08; G01N 35/1016; G01N 2001/1427; B01L 3/0293; B01L 2400/0487
USPC ..... 73/61.55, 64.56, 863.01, 864.21–864.25, 73/864.34, 864.35, 864.81; 422/63, 501, 422/509, 510, 515, 521
See application file for complete search history.

(56) References Cited

U.S. PATENT DOCUMENTS

| | | | | |
|---|---|---|---|---|
| 4,713,974 | A | * | 12/1987 | Stone ...................... G01N 30/24 422/64 |
| 5,078,970 | A | * | 1/1992 | Teodorescu ........ G01N 35/1079 422/512 |
| 5,192,504 | A | * | 3/1993 | Cassaday ................ B01L 3/508 356/72 |
| 5,871,699 | A | * | 2/1999 | Ruggeri ................... G01N 1/14 422/512 |
| 2007/0062875 | A1 | | 4/2007 | Usowicz |
| 2010/0276019 | A1 | * | 11/2010 | Kawabata ................ G01N 1/38 137/565.26 |
| 2013/0014566 | A1 | * | 1/2013 | Marks .................... G01N 30/24 73/61.55 |

\* cited by examiner

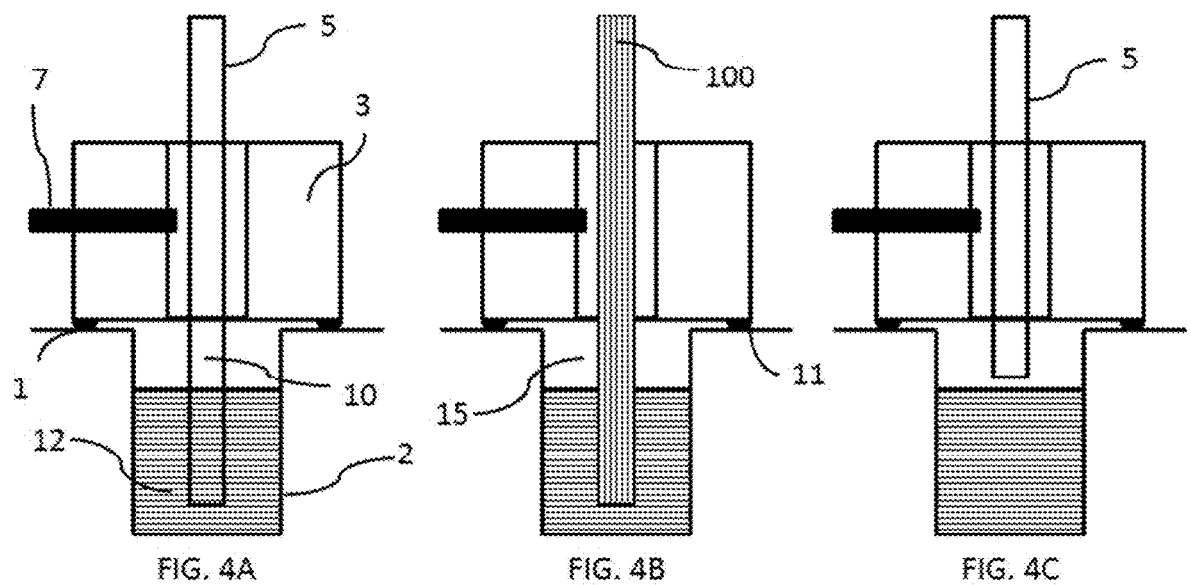

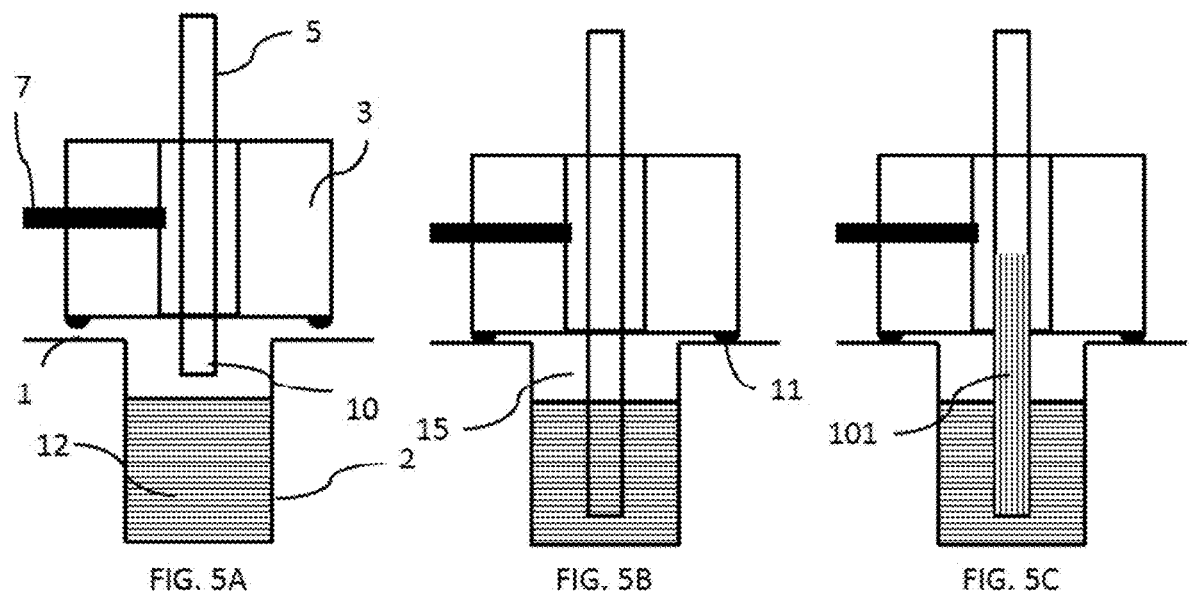

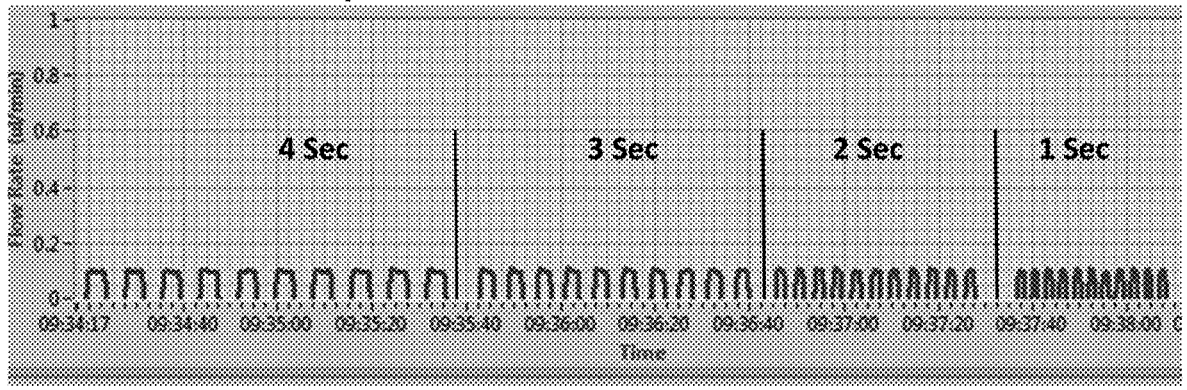
FIG. 10A  100 nL/min
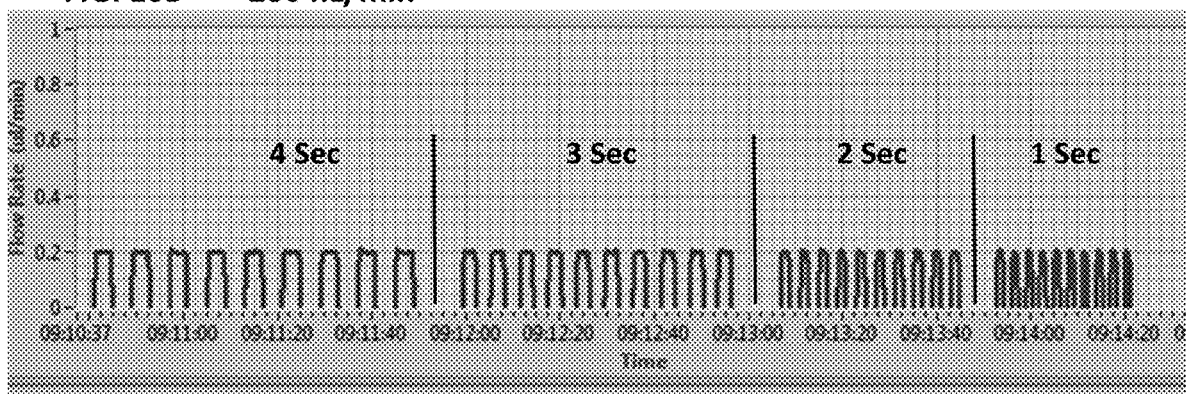
FIG. 10B  200 nL/min
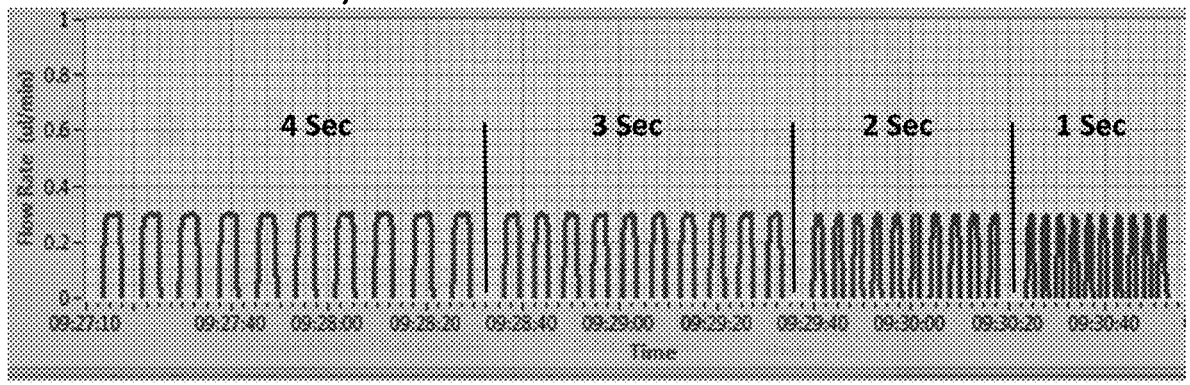
FIG. 10C  300 nL/min

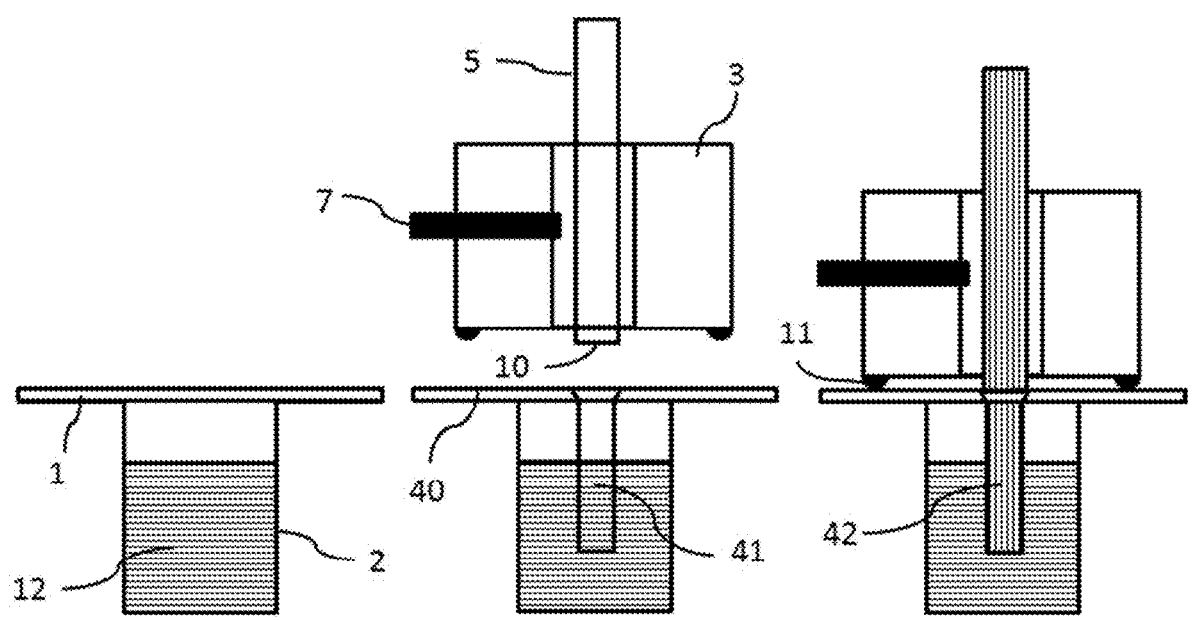

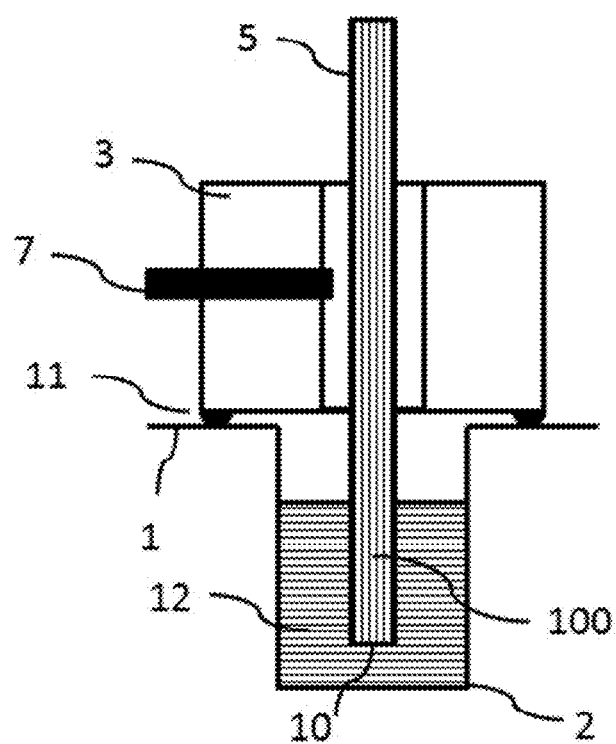
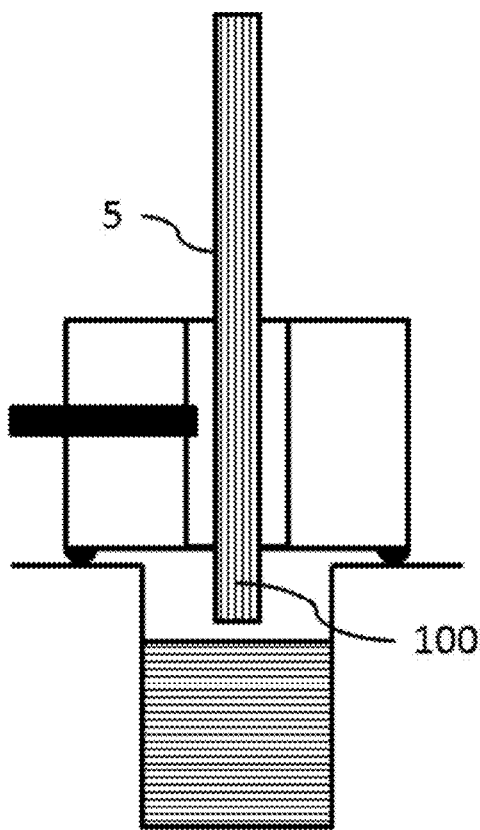
FIG. 12A
FIG. 12B

PRESSURE CONTROLLED FLUID SAMPLER AND METHOD

CROSS REFERENCE

This application claims the benefit of the filing date of U.S. Provisional Patent Application Ser. No. 62/326,386, filed Apr. 24, 2016, which is hereby incorporated by reference in its entirety.

FIELD

The present disclosure relates to a pressure controlled fluid sampler, and in particular a pressure controlled fluid sampler utilizing positive-pressure liquid displacement for fluid sampling, system and method thereof.

BACKGROUND

Conventional autosamplers use both negative and positive pressure to deliver a sample aliquot. Typically an autosampler begins the sampling process by extending a conduit or tube into the well, vial, reservoir, vessel, plate or container that holds the sample of interest. Once the needle is submerged into the sample, the autosampler uses negative pressure or a vacuum to aspirate the sample into the needle which is typically connected to a tube and subsequently to a valve. The valve often has a "sample loop" which is a piece of tubing having a known inner volume. In its aspiration step, the autosampler fills the needle, the tube, the valve and the sample loop, with the sample of interest using negative pressure, which has a physical limit of 1 atmosphere or 1 bar. This means that conventional autosamplers cannot draw-up samples faster than this physical limit. Although increasing the tubing/needle inner diameter is a common means to abate the negative consequences of this physical limitation, this is simply not practical for low flow rate applications, particularly those that use capillary tubes. Thus this substantial fill-time imposed by aspirating sample using negative pressure is a severe limitation to conventional autosamplers. Once the sample is finally aspirated and the sample loop is full, the injection valve will switch positions, causing the loop to come in-line with the flow, which then transports the plug of sample from the loop by positive pressure into the analysis system.

Although conventional autosamplers use both negative and positive pressure, it is the aspiration of the sample through vacuum or negative pressure, which is detrimental to the approach. The aspiration step is slow and cannot be accelerated due to the physical limit of a vacuum of 1 atmosphere. As detection techniques, such as mass spectrometry, have become increasingly rapid, it is the current sampling approaches that are now limiting the overall speed of analysis. Therefore a faster means of introducing samples to an analysis instrument, would be highly advantageous and have wide commercial importance.

Additionally, to switch between positive and negative pressure, conventional autosamplers require valving within the flow path to the detector or final delivery location. This valving is often a source of carrier-over or cross-contamination between adjacent samples due to its introduction of dead-volume and internal geometry changes (i.e., fitting ports and rotor seals) within the flow path.

SUMMARY

In accordance with one aspect of the present disclosure, there is provided a fluid sampler system, including a fluidic head including a gas aperture capable of communication with a pressurized gas source, a liquid conduit capable of communication with a liquid contained in at least one sample reservoir, and a seal capable of forming a compression seal to the at least one sample reservoir when gas pressure is applied to the at least one sample reservoir through the gas aperture and capable of displacing a portion of the liquid through the liquid conduit; and a positioning apparatus capable of positioning the fluidic head and the at least one sample reservoir in communication with one another.

In accordance with another aspect of the present disclosure, there is provided a method for providing an aliquot of sample, including forming a releasable compression seal to a first reservoir including a first liquid sample; pressurizing the first reservoir with compressed gas; displacing a first aliquot of the first liquid sample from the first reservoir; and transferring the displaced first aliquot of the first liquid sample to a first location.

These and other aspects of the present disclosure will become apparent upon a review of the following detailed description and the claims appended thereto.

BRIEF DESCRIPTION OF THE DRAWINGS

FIGS. 4A, 4B and 4C show an example of transferring sample from the sample well into the fluid conduit and then voiding it from the tube;

FIGS. 5A, 5B and 5C show an example of a three step process transferring a small aliquot of sample from the sample well into the fluid conduit using the positive displacement approach;

FIGS. 10A, 10B and 10C show examples of fluid manipulation achieved at three different flow rates;

FIGS. 11A, 11B and 11C show an example of a sealed well with a traditional barrier seal on the plate requiring piercing or penetrating by the fluidic head, an alternatively integrated conduit in the well plate or sealing mat, and sampling when the fluidic head interfaces to the integrated conduit;

FIGS. 12A and 12B show the fluid conduit can move independently from the gas pressure sealing structure of the sampling head.

DETAILED DESCRIPTION

To overcome the lengthy cycle time between injections caused by negative pressure sample aspiration, the present disclosure uses a positive-pressure liquid displacement approach for fluid sampling. With this approach, a pressure controller is able to rapidly pressurize and depressurize sample wells, directing aliquots of sample into a detector, such as a flow injection analysis system, liquid chromatograph, mass spectrometer, UV detector, or the like. This approach of applying pressure allows for much higher fluid delivery rates as it does not have the physical limits that negative pressure (vacuum) has. Samples can be immediately adjacent (no separation), or spaced by one or more plugs of gas, solvent, oil, or the like, or any combination. Here positive pressure, as opposed to the conventional negative pressure, is used to direct sample into a detector. As positive pressure does not have the same physical limitations as negative pressure, samples can be rapidly manipulated. Also unlike conventional autosamplers, this approach does not require fluid switching components (for example, switching valves) in-line to the detector, and thus reduces carry-over and cross-contamination.

Figure 1:
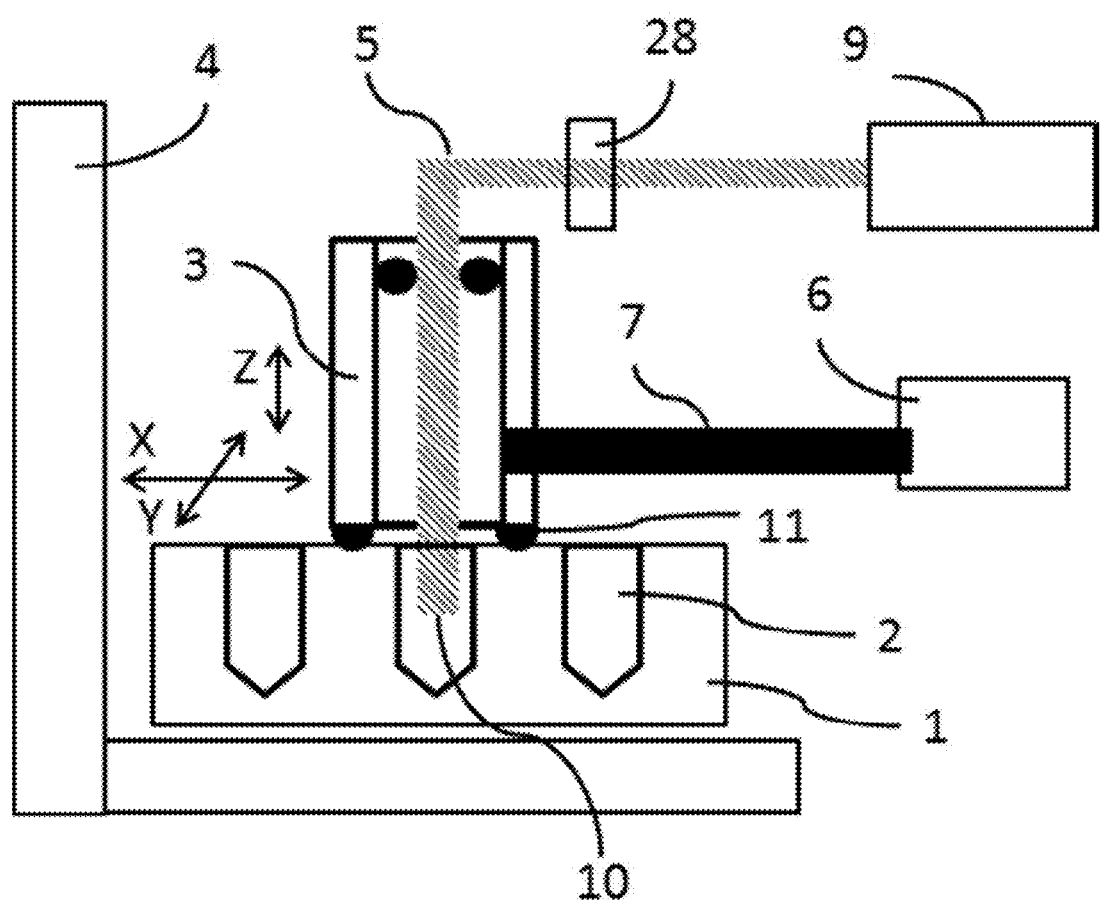
FIG. 1 is a schematic of a sampler in accordance with the present disclosure.
Figure 2:
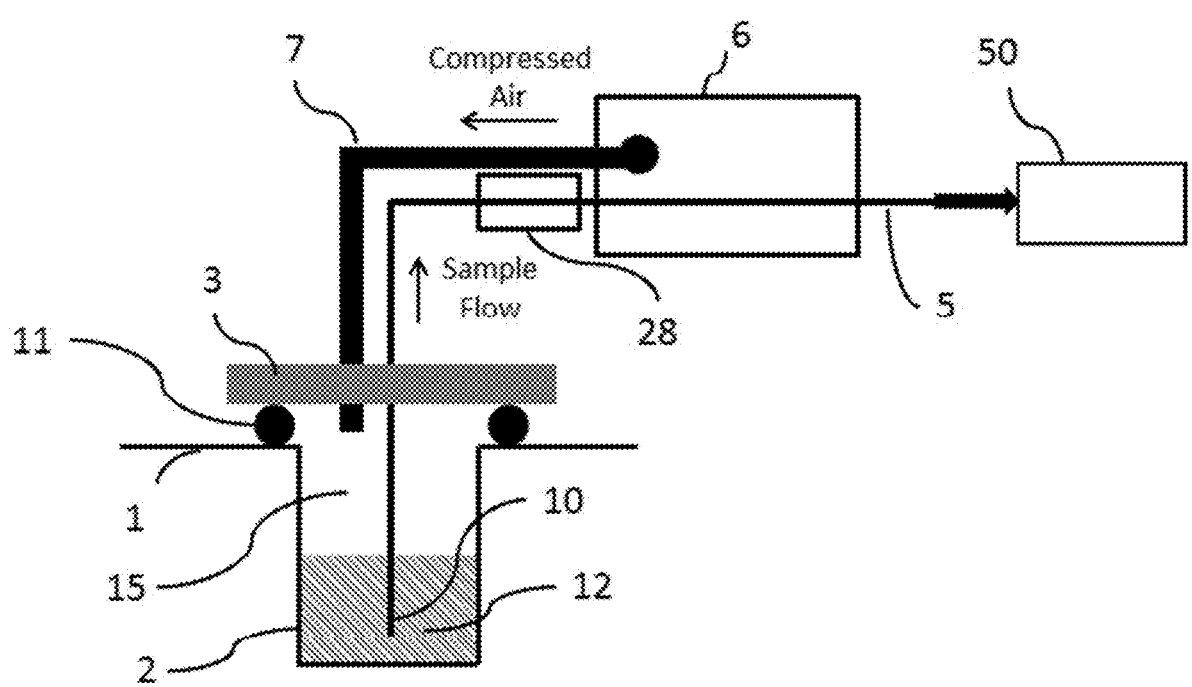
FIG. 2 is a schematic of a sampler including a sampling head sealed to the surface around a sample-containing reservoir.

In FIGS. 1 and 2, a fluid sampler includes sample reservoirs located on XY positioning stages, a sampling fluidic head (probe), and a pressure controller regulation system. Samples are located in vials, plates 1, wells 2, containers or any reservoir type. The sampling head or sealing head 3 has the ability to both sample liquid and seal 11 around the surface or perimeter of the sample-containing reservoir. The compression seal on the vessel or reservoir may be on the interior, exterior, or surrounding surface. Seals may be made to vessel or reservoirs having any geometry compatible with a compression seal. The sampling head 3 is moved above the desired reservoir 2 by the well plate 1 being positioned by a translational system 4. Then the sampling head 3 descends so that the fluidic conduit opening 10 enters the liquid sample 12 and a portion of the head makes a compression seal 11 around the surface of the sample-containing reservoir 2. The entire sample reservoir 2 is then rapidly pressurized, with the pressure regulation system 6 which is connected to the sampling head through a gas line 7. The pressure regulation system is composed of a pressure source 13 and a meter 14. The sample is displaced into the fluidic conduit opening 10 and filling a fluid conduit 5. Then the fluidic conduit opening 10 rises into the headspace 15 above the liquid so that it is no longer submerged in the liquid sample 12, while the reservoir 2 remains pressurized. This results in the fluidic conduit opening 10 and fluid conduit 5, quickly filling with headspace gas. As the fluidic conduit opening 10 and tube 5 fill with gas, the sample 12 is delivered to the detector 9, and the system is fully voided of the liquid sample 12. Then the reservoir 2 is depressurized, the head 3 raises and moves to the next sample-containing reservoir 2, where the process will repeat. An expanded view for a single sample reservoir 2, is provided in FIG. 2 showing the sampling head sealed to the surface around the sample-containing reservoir. The well is pressurized when compressed gas is delivered by the pressure source. This allows a sample aliquot to be transferred into the fluid conduit by positive pressure. The sample volume delivered into the fluid conduit is controlled by pressure applied to the sample reservoir. This pressure may be controlled by time or using a fluid detector 28 with open or closed-loop feedback. The system may contain a bubble or fluid (air or liquid) detector which will alarm if air is introduced into the sampler or as a means to count or track liquid aliquots. The sample is ultimately delivered to a final location 50, such as a detector, collection reservoir, mass spectrometer, microfluidic device, resonance detector, optical detector, or the like.

Figure 3A:
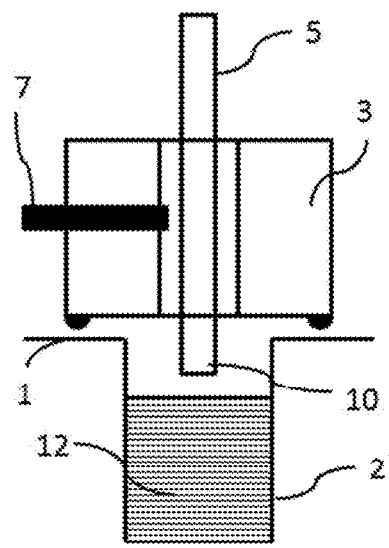
FIGS. 3A, 3B and 3C show an example of 3 steps for transferring sample from the sample well into the fluid conduit using the positive displacement approach.
Figure 3B:
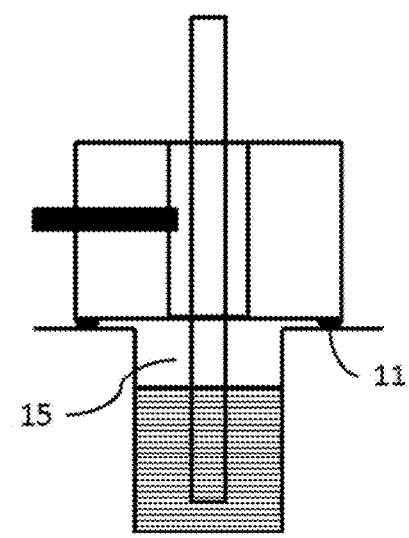
Figure 3C:
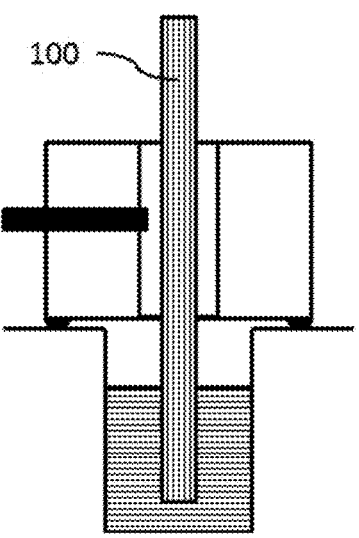

Steps for the sampling process transferring sample from the sample well into the fluid conduit using the positive displacement approach are shown in FIG. 3. The first step, FIG. 3A, is the positioning of the plate 1 so that the sampling head 3 is located above the sample reservoir or well 2 of interest. Then in the second step, FIG. 3B, the sampling head 3 forms a compression seal 11 around the perimeter of the reservoir. The fluid conduit opening 10 enters the sample 12. In step 3, FIG. 3C, the reservoir is pressurized from the gas line 7 which leads to the pressure regulation system 6. Once pressurized, liquid sample 12 moves into the fluid conduit 5 and fills the conduit 100.

An example of transferring sample from the sample well into the fluid conduit and then voiding it from the tube is shown in FIG. 4. FIG. 4A shows the sampling head 3 sealed against a sample-containing reservoir 2 in step 1. In step 2, FIG. 4B, the reservoir 2 has been pressurized and liquid sample 12 has moved into the fluid conduit 5. Then in step 3, FIG. 4C, the fluidic conduit opening 10 has been raised so that it is no longer submerged in the sample 12, but rather now is in the gaseous headspace 15 above the sample 12. As the reservoir remains pressurized with the compression seal 11 between the sampling head 3 and the plate 1 intact, gas is quickly drawn up into the fluid conduit 5. This results in the sample 12 that had been in the tube 100, being directed to the detector and exiting the system. At this point the system would no longer contain the liquid sample 12.

As an alternative to using the headspace 15 above the sample 12 to flush the liquid from the system, a dedicated reservoir containing the desired gas composition could be employed. Here, after the sampling head 3 is positioned and sealed over the reservoir 2, the reservoir 2 is pressurized, and the fluid conduit 5 is filled with sample 12, then the sample reservoir 2 is depressurized and the head 3 is moved to a dedicated gas-containing reservoir. The head 3 would form a compression seal 11 around the gas-containing reservoir, and the entire reservoir would be rapidly pressurized, resulting in the liquid sample 12 being directed to the detector 9 as the fluidic conduit opening 10 and transfer line 5 quickly fill with gas. Once the system has been purged of the liquid sample 12, the gas-containing reservoir would be depressurized, and the head 3 would be positioned over the next liquid sample well 2 of interest where the process would be repeated.

As an alternative to filling the fluid conduit 5 entirely with sample 12, just an aliquot or plug of sample 12 could be delivered to the fluid conduit 5 instead. FIG. 5 shows the steps to accomplishing this. In step one, FIG. 5A, the sampling head 3 is positioned above the desired reservoir 2 in sample plate 1. In step two, FIG. 5B, the sampling head 3 then descends so that the fluidic conduit opening 10 enters the liquid sample 12 and a seal 11 is made around the reservoir 2. In step three, FIG. 3C, the entire sample reservoir 2 is then rapidly pressurized with the pressure regulation system which is connected to the sampling head 3 through a gas line 7. This results in an aliquot 101 of the sample 12 being displaced into the fluidic conduit opening 10. The small aliquot has a volume that is only a fraction of the total volume of the fluid conduit. The volume of the aliquot is controlled by the pressure regulation system, which is capable of rapidly pressurizing and depressurizing sample wells. Next the reservoir 2 is depressurized, the head 3 raises and as it moves to the next sample-containing reservoir 2, an aliquot of air is displaced into the fluidic conduit opening 10. Once the head is positioned above the second desired sample-containing reservoir 2, it descends so that the fluidic conduit opening 10 enters the liquid sample 12 and a portion seals 11 around the surface of the reservoir 2. Once again, the entire sample well 2 is pressurized, and an aliquot of sample 12 is displaced into the fluidic conduit opening 10. Then as the sampling head 3 moves to the third well 2, it once again displaces an aliquot of air. This cycle is repeated so that samples, spaced by air gaps as described here, are directed into the fluid path of the detector.

Figure 6A:
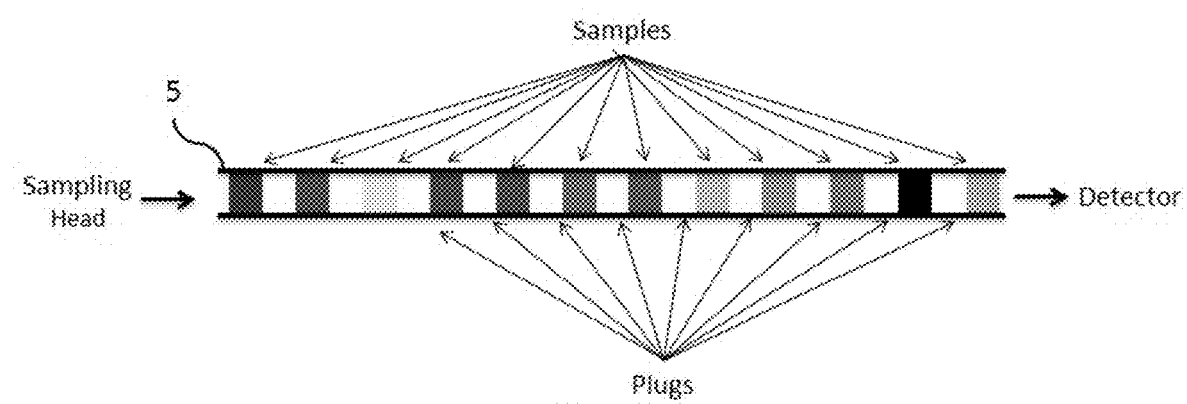
FIGS. 6A and 6B show a rendition of the fluid conduit between the sampling head and the entrance to the detector when sample aliquots are being collected.
Figure 6B:
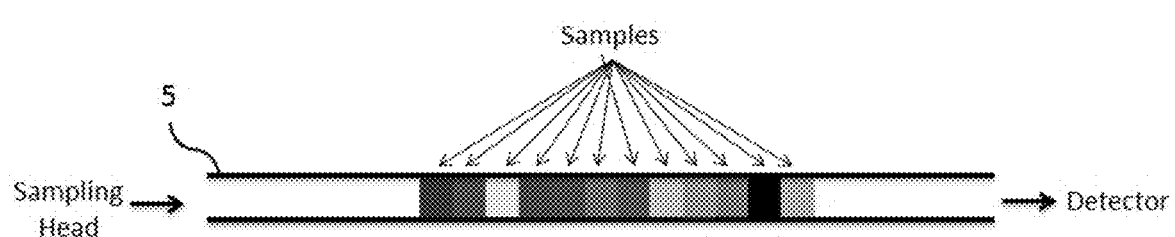

Alternatively, samples are not separated, as shown in FIG. 6B, or can be separated by gaps containing gas, immiscible liquids, solvent, oil or the like, or any combination thereof, as shown in FIG. 6A. A rendition of the fluid conduit is shown between the sampling head and the entrance to the detector when sample aliquots are being collected. The tube, fluid conduit or conduit can contain any combination of fluid or gas aliquots. Sample aliquots, represented by the solid colors, are separated by gas, solvent, oil, or combination gaps, represented in white, as shown in FIG. 6A and are not separated by any gaps, as shown in FIG. 6B.

As an alternative to the gas gaps, samples could also be separated by solvent gaps, as shown in FIG. 6A. In this case, for the proposed prototype system, samples would be spaced with solvent blanks in the actual well plate. Then as the head moves along the plate, sampling from each well, the end result will be samples spaced by solvent gaps. It is also possible that optimal results will be achieved when samples are separated by a solvent gap and an air gap. It is also possible that optimal results will be achieved when samples are not separated and instead are immediately adjacent to one another, as shown in FIG. 6B.

Figure 7:
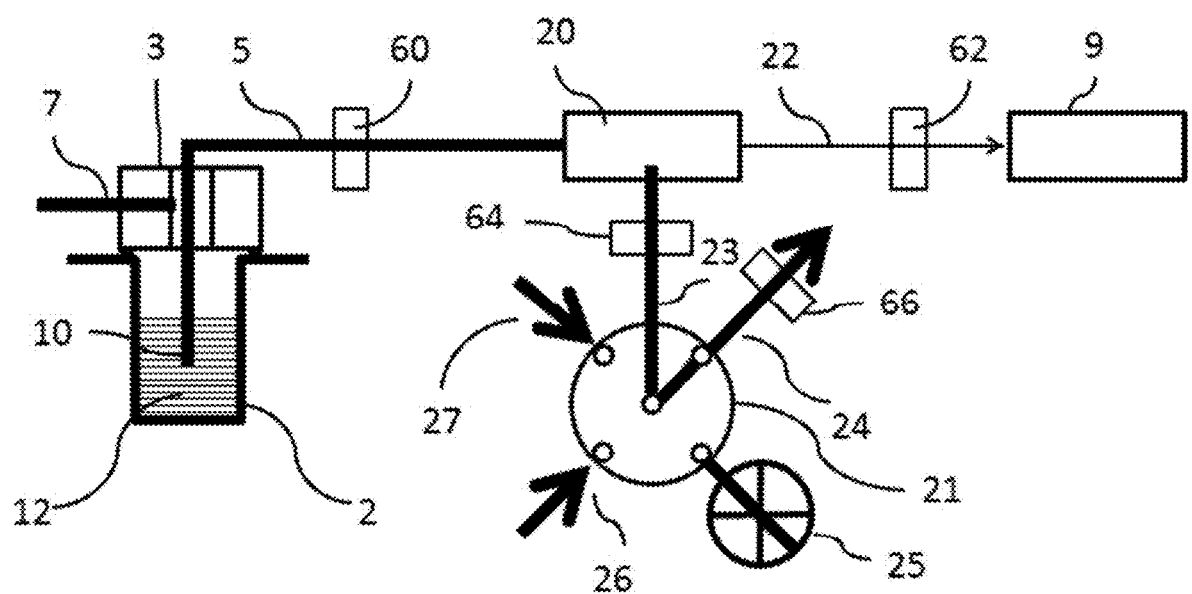
FIG. 7 shows an alternative fluid path branch in the fluid conduit which uses restriction, created by adjusting the inner flow path diameter, to direct fluid flow.

FIG. 7 shows an alternative fluid path branch in the transfer line which uses restrictive forces, created by adjusting the inner diameter of tubing, to direct fluid flow. During pressurization of the reservoir or well, the liquid sample moves into the fluid conduit 5 through the fluidic conduit opening 10 and to a flow redirect component 20, such as a "tee", "Y" splitter, manifold, or similar component with one in-path and two or more exit paths. A valve 21, that is connected to this redirect component 20 is outside the flow path to the detector 9, as represented by the flow path through the fluid conduit 5 and the tube 22, is in one of multiple positions. If the valve is in an open position 24 as shown, the sample flows through the pathway of least resistance, which would be through the valve 21 and to a collection container. However if the valve is in a closed position 25, then the liquid sample can overcome the restrictive forces created by the small inner diameter tube 22, and travel from the flow redirect component 20 towards the detector 9. The valve 21 could have other positions available such as one position 26 to inlet a liquid to flush the system, and another position 27 to inlet a gas to flush the system.

Alternatively, an aliquot of sample is displaced by positive pressure into a fluid conduit 5 connected to a flow redirect component such as a "tee", as shown in FIG. 7. At one leg, the flow redirect component 20 is connected to a valve 21, and at the other leg, the flow redirect component 20 is connected by a small inner diameter tube 22 which is directed to the detector 9. This tube 22 to the detector 9 has a much smaller inner diameter than both the fluid conduit 5 connecting the sample well to the flow redirect component 20, and the conduit pathway 23 from the component 20 through the valve 21. Alternative to using a small inner diameter tube, restriction could also be accomplished through the use of longer tubing lengths or a restriction orfice(s). Therefore, when the valve 21 is in an open position 24, the sample 12 flows freely from the well 2, through the redirect component 20 and the valve 21, and through valve position 24 to waste, as this is the path of low resistance. In this valve open position 24, sample 12 will not easily travel through the small inner diameter tube 22 directed to the detector 9, as this is the path of high resistance. However, when the valve 21 is switched from its open position 24, to a closed position 25, sample 12 will no longer be allowed to travel through the valve 21, and instead, sample 12 will be forced to travel through the small inner diameter tube 22 directed to the detector 9. In this manner, with the valve 21 in an open position 24, the fluid conduit 5 of the sampling head 3 could be quickly filled with sample 12 from the sample well 2 by positive displacement by pressure from the gas line 7. Then to quickly aliquot a small volume of sample 12, the valve 21 would turn to the closed position 25, forcing sample 12 to be displaced into the small inner diameter tube 22 going to the detector 9. Finally the valve 21 would switch back to the open position 24, stopping the sampling process. Using this embodiment, the volume of sample 12 transferred to the detector 9 can be determined by knowing the duration of time the valve 21 spent in the open position. In addition to having an open position 24 and a closed position 25, the valve 21 could offer further pathways. For example, a position 26 could offer a means to inlet a flush liquid to purge the system, or insert a liquid plug between samples. Another position 27 could offer a means to inlet a flush gas to purge the system, or insert a gaseous plug between samples.

Alternatively this embodiment, as shown in FIG. 7, could be used with one or multiple bubble or fluid interface detectors, which could be used to determine flow rates and total sample volumes directed to the detector. These bubble or interface detectors 60, 62, 64, 66 could be positioned at any point in the system's flow path, such as but not limited to, along 60 the fluid conduit 5 from the well, along 62 the small inner diameter tube 22 going to the detector 9, along 64 the pathway 23 connecting the flow redirect component 20 to the valve 21, and along 66 the flow path from the valve 21 when it is in the open position 24. Furthermore, one or more detectors could be positioned at these or similar locations for determining localized flow rates or volumes.

In one embodiment, one (as shown in FIG. 1) or multiple detectors 28 that measure bubbles, air-to-liquid, or liquid-to-liquid interfaces are placed in-line. These bubble or interface detectors 28 are external to a conduit in which sample are flowing. By knowing the volume between detectors 28, and the time it takes for a bubble or interface to travel from one detector to another, flow rates and total volumes displaced, can be calculated. These bubble or interface detectors 28 can be placed on the exterior of the fluid conduit. They may also be placed in pairs for close proximity readings. They are able to differentiate liquid from gas, and they can differentiate between liquid types, such as oils, alcohols, hydrocarbons, and water. These non-contact sensors can be optical, thermal, ultra-sonic, or refractive index based for example.

In one embodiment the sampler contains a bubble or interface detector 28 which will alarm in various user-defined situations such as if air gets trapped in the system due to a leak or no sample in the reservoir. In another embodiment the bubble or interface detector 28 will alarm if the signal does not match expected outcomes.

Figures 8A, 8B:
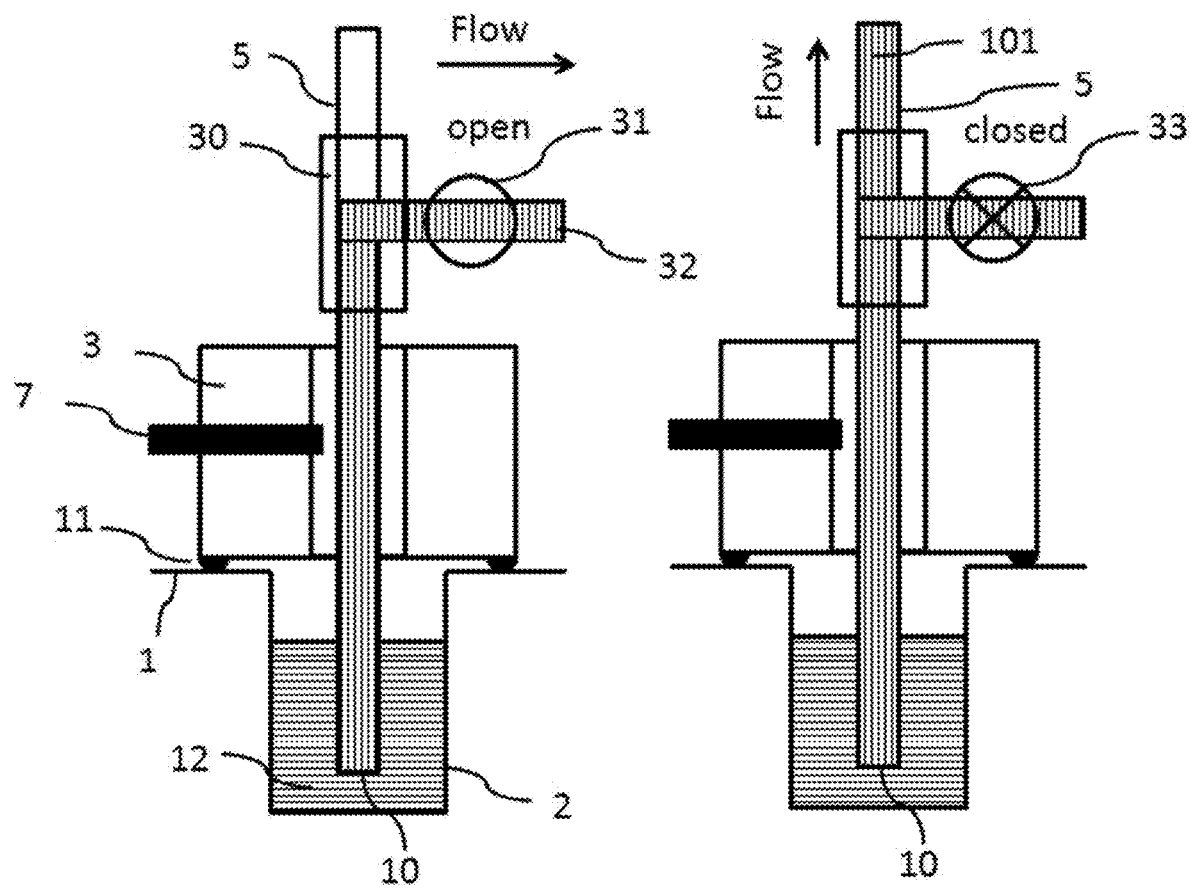
FIGS. 8A and 8B show a fluidic head with an alternative fluid path branch that allows for filling the conduit path up to and into the branch pathway.

In another embodiment as shown in FIG. 7, a head pressure greater than atmospheric pressure may be applied to one or more conduits, such as fluid conduit 5, conduit pathway 23, and the flow path from the valve 21 when it is in the open position 24, in order to counter capillary action filling forces, to prevent or slow liquid from entering the conduits. Subsequently, pressurizing liquid containing reservoirs will allow for filling of the conduit. This limiting of capillary action filling forces can also be accomplished as shown in FIG. 8A by applying a head pressure greater than atmospheric pressure to branching pathway 32.

In a preferred embodiment shown in FIG. 1, sample containing reservoirs 2 would be placed so that they may be positioned by the robotics or translation system 4. These reservoirs 2 may be vials, well plates 1 such as those following common formats of 48, 96, 386 and 1536 or other variations, or any other fluid containing reservoir. This is similar to that of a modern HPLC autosamplers. The sample containing reservoirs 2 are placed in a robotic manipulation system 4, such as a gantry style system, that is capable of positioning any of the given sample wells under the fluidic sampling head 3.

As shown in FIG. 4, after the desired sample 12 has been positioned under the sampling head 3, the head 3 moves down and creates a compressive force that results in a compression seal 11 around the perimeter or surface of the sample contacting reservoir 2. Next the fluidic conduit opening 10 or fluid conduit 5 is positioned in the liquid sample 12. Alternatively the fluid conduit 5 can enter the fluid sample 12 prior to establishing the compression seal 11, or before the seal 11 is established. A positive pressure is applied to the reservoir 2 and the liquid fluid 12 in the well 2 is displaced, being pushed into the fluid conduit 5. The fluid conduit 5 is filled with sample 12. Then the sampling head 3 is raised slightly, so that its opening 10 is no longer submerged in liquid sample 12, but rather in the gaseous head space 15 above the liquid sample 12. The pressure in the reservoir 2 can be the same or different as it was for the earlier sample fill step. At this point the fluid conduit 5 quickly fills with gas, delivering the sample 12 to the detector 9 and then emptying the transfer line 5 of any liquid content. A controlled vent of the gas pressure in the sample reservoir 2 then occurs to depressurize the reservoir 2. The sampling head 3 retracts. The stage 4 then positions to the next well 2 or fluid reservoir to be sampled, and the process repeats.

In an alternative embodiment shown in FIG. 5, instead of filling and then purging the fluid conduit 5 with liquid sample 12, aliquots 101 of samples 12 are collected in the fluid conduit 5. Here, after the desired reservoir 2 has been positioned under the sampling head 3, the head 3 moves down and creates a compressive force that results in a compression seal 11 around the perimeter or surface of the sample contacting reservoir 2. Next the fluid sampling or fluid conduit 5 is positioned in the liquid 12. Alternatively the fluid conduit 5 can enter the fluid sample 12 prior to establishing the compression seal 11, or before the seal 11 is established. A positive pressure is applied to the reservoir 2 and the liquid aliquot 101 in the well 2 is displaced, being pushed into the fluid conduit 5. The controlled pressure is applied to the well 2 to displace the fluid 12 to yield a controlled flow rate. This pressure is then applied for a controlled time, volume, or rate (either measured or calculated). Pressure may be adjusted to change or maintain the flow rate for a given time or volume. The flow rate may be monitored by a fluid detector (in an open loop monitoring or closed loop feedback mode). Upon sample introduction and completion of the liquid fluid displacement into the fluid tube 5, the process is stopped by a controlled venting of the gas pressure to reduce the pressure in the well 2. This reduced pressure will stop the displacement of the liquid 12 into the inlet of the fluid tube 5. The fluid head 3 then retracts. The stage 4 then positions the next well or fluid reservoir 2 to be sampled and the process repeats.

The fluidic head is shown in FIG. 8 with an alternative fluid path branch that allows for filling the conduit path up to and into the branch pathway (where the branch pathway has a lower restriction than the primary conduit fluidic path). During pressurization of the reservoir by pressure from the gas line 7, the branch pathway valve is open, allowing the liquid to flow out the branch. Upon closing the branch valve, the fluid goes through the primary conduit pathway. This allows for the fixed volume from the conduit entrance to the branch pathway to be sampled. This fixed volume may be adjusted by changing the internal dimensions of the conduit and/or fluidic pathway.

In another alternate embodiment, as shown in FIG. 8, the sampling head 3 has an integrated branching path 30 (for example, a split such as a tee, Y, manifold, valve architecture), where one leg of the tee extends into the liquid sample 12, the fluid conduit 5 leg of the tee is more restricted (either via cross-section or length or via a valve) and leads to the analysis flow path, and the third leg 32 of the tee has little restriction with an in-line valve 31 and leads to a waste reservoir. Here once the sampling head 3 has sealed 11 around the perimeter of the sample reservoir 2 in sample plate 1, and the reservoir 2 is pressurized. With the valve 31 in the open position, FIG. 8A, and little resistance to hinder flow, liquid sample 12 is transferred through the fluidic conduit opening 10 only to the branching pathway 32. Here the liquid 12 is directed to waste or recycled back to a collection reservoir, as liquid sample 12 cannot overcome the resistance needed to travel the analysis flow path 5. Once the valve 31 is turned to the closed position 33, FIG. 8B, a plug of liquid 101 is able to overcome the resistive forces and travel down the fluid conduit 5. This embodiment allows for sample plugs or aliquots having highly reproducible volumes to be sampled from each reservoir 2. The branch 32 may also serve to black flush a solution towards the reservoir 2.

In another alternate embodiment, shown in FIG. 7, the transfer line 5 has an integrated branching path or flow redirect component 20 (for example a TEE or Y architecture), where one leg 5 of the component 20 extends from the sampling head 3, one leg 22 of the component 20 is more restricted (either via cross-section or length or via a valve) and leads to the analysis flow path and detector 9, and the third leg 23 of the component 20 has little restriction with an in-line valve 21. Here once the sampling head 3 has sealed 11 around the perimeter of the sample reservoir 2, the reservoir 2 is pressurized. With the valve 21 in the open position 24, and little resistance to hinder flow, liquid sample 12 is transferred only to the branching pathway 24 which may led to waste or recycled back to the sample reservoir 2, as the liquid sample 12 cannot overcome the resistance needed to travel the analysis flow path 22 to the detector 9. Once the valve is turned to the closed position 25, a plug of liquid 12 is able to overcome the resistive forces and travels down the analysis flow path 22 toward the detector 9. This embodiment allows for sample plugs having highly reproducible volumes to be sampled from each reservoir 2. Additional valve positions may also serve to black flush a solution 26, or a gas 27, towards the reservoir 2. This could serve as a system purge or wash.

Figure 9:
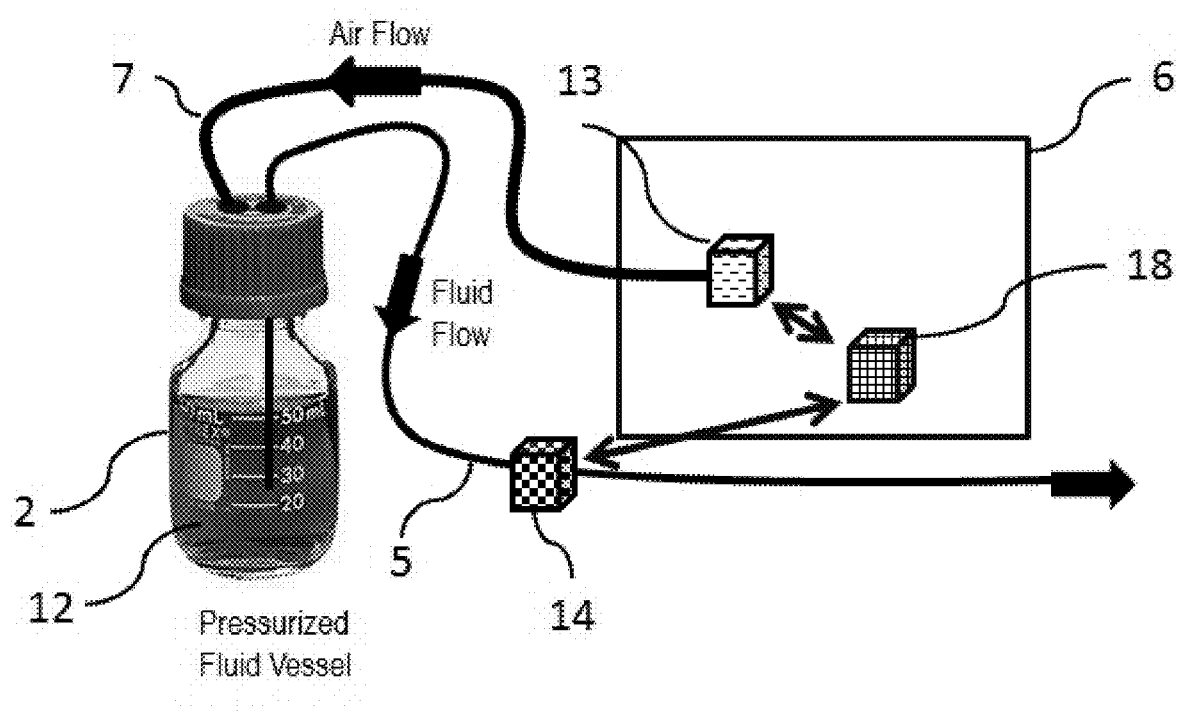
FIG. 9 shows a schematic of a closed-loop, pneumatic-based pump with a rate meter, pressure source and controller and microprocessor.

As shown in FIG. 9, an important aspect of this proposal is the pressure regulation system 6 which dictates how quickly sample wells 2 are pressurized via the gas line 7, and controls the volume of sample aliquots 12 displaced into the fluid conduit 5. This pressure regulation system 6 contains three components which may or may not be integrated: a pressure source and controller 13, one or more fluid detectors 14 which may consist of a flow rate sensor or fluid interface detector, and a microprocessor 18 which allows the pressure source 13 and the fluid detector(s) 14 to communicate. The pressure regulation system 6 operates with closed-loop feedback control. The pressure regulation system 6 will pressurize the sample-containing reservoir 2, which then causes sample 12 to be displaced from the reservoir 2 into a fluid conduit 5. A fluid detector 14, which can be located on the sampling head 3 or elsewhere in the system, detects the sample 12 transferred to the conduit 5. Once the desired sample 12 has been delivered to the conduit 5, the microprocessor 18 will trigger the pressure source and controller 13 to de-pressurize the sample-containing reservoir 2, thereby terminating the collection of that particular sample's aliquot. Once the sampling head 3 has re-positioned over the next sample-containing reservoir 2, the process repeats.

Using this system, when each sample well 2 is rapidly pressurized by the pressure regulation system 6, the rate meter 14 will measure the volume of liquid 12 passed. Once the desired volume has been reached, the compression regulation system 6 will quickly vent, depressurizing the sample well 2. In this manner, fluids can be rapidly and precisely manipulated. An example is shown in FIG. 10 where fluid was delivered at three different flow rates, 100 nL/min (FIG. 10A), 200 nL/min (FIG. 10B) and 300 nL/min (FIG. 10C) and was rapidly switched "on" and "off". The time duration that the fluid switch was "on" and "off" was 4 sec, 3 sec, 2 sec and 1 sec, as indicated for each flow rate. These results indicate that rapid, sequential sample collections with nanoliter resolution are possible using this gas displacement technique.

The controlled pressure applied to displace the liquid 12 depends on the system back pressure requirement. This is affected by the fluid path components such as flow path ID(s), length(s), as well as the viscosity of the liquid. It would be obvious to anyone skilled in the art to determine what pressure is required to displace the liquid relative to a given system requirement. This includes other parameters such temperature, viscosity affects, mixing, sheer, Newtonian and non-Newtonian fluids.

The pressures for open tubing systems may range from 0-10 of bars and for systems with higher back pressure such as separation columns or reaction columns the pressure requirement would be higher in the 10 to 1000 Bar. System back pressures may be changed by parameters such as tubing ID or length or using an orifice or restrictor.

A compression source such a compressor may be part of the fluidic head assembly or independent of the fluidic head. The compression source may be, for example, a compressor, a compressed gas tank, or a gas generated from a liquid source.

The gas source type may include air, nitrogen, argon, helium, carbon dioxide or the like, or any mixture thereof.

An optional gas storage reservoir may be used for before fluid head as orifice to insure there is ample flow for the quick pressurization of the well volume. This storage reservoir volume capacity is dependent on the volume to be filled and the flow capacity of the pressure regulation system.

The fluid flow rate range operates between about 0 to about 1000 microliters/min, but preferable in the following ranges depending on the application or detector type. Preferable ranges include less than about 1 milliliter/min, about 10 to about 1000 nanoliters/min, about 1 to about 10 microliters/min, about 10 to about 200 microliters/min, about 200 to about 1000 microliters/minute or about 100 nL to about 1000 microliters/min. These flow rates correspond to nanoelectrospray, microelectrospray, and electrospray flow rate regimes.

Once the liquid 12 shown in FIG. 9 is delivered to the conduit entrance (i.e., the aliquot is formed), the flow rate may be varied. For example, twelve aliquots may be formed from a given well or from a combination of multiple wells, the pressure may be increased to deliver the aliquots at a faster rate in the conduit as to reach the fluid path exit more quickly.

Injection of gas, non-miscible liquid, or miscible liquid may be injected between the sample aliquots. These may include a standard or molecule for discerning the difference from an unknown sample type for an analysis.

The fluid path may contain an electrospray, or microelectrospray, or nanoelectrospray emitter.

In addition to a delivering the aliquot to a detector, the aliquot may be delivered to a location or alternative device such as dispensing tip, spray orifice, plate surface, or tube. A thermal non-contact rate meter or fluid detector is capable of various functions in the system including: monitor flow rate, control flow rate changes with closed-loop feedback to the pressure system, and detecting flow change profiles for identifying the sample aliquots. The detection of the aliquots may be accomplished as the flow rate changes or medium changes (gas or liquid types). The detector has the ability to see various solution type changes as well detect liquid vs. gas. The variation is detectable and may be used to count or correlate to the expected change for each new injection. The detector may operate at time constant or flow detection response time faster than about 1000 milliseconds and more preferably faster than about 40 milliseconds.

The system cycle time of positioning the well, pressuring, depressurizing, and detaching from the well is capable of being faster than about 5 seconds and more preferable about 3 seconds and most preferable quicker than about 1 second. The flow rate or aliquot injection into the conduit is depended on the desired volume or flow rate for the application. This automated sealing of the fluidic head, application of positive gas pressure, and fast depressurization of the reservoir allows for faster cycle times than conventional auto sampler approaches. The present technology also circumvents the constraint of conventional autosamplers which require washing of in-line valving, ports and rotor seals for minimizing sample-to-sample cross-contamination.

The system can actively vent to relieve pressure via a valve or pressure regulation controller. Alternatively, the head may move up, releasing the compression seal around the perimeter or surface of the sample containing reservoir. The venting may have a controlled rate when reducing the pressure in the well. In one embodiment the pressure may be reduced to the target pressure faster than about 1 second, and more preferably less than about 500 milliseconds.

The fluid path from the reservoir to the desired end delivery location, presumably the detector, may be one continuous inner diameter tube, or made up of one or more segments. These segments may have the same or different internal dimensions. The inner diameter of the fluid path is less than about 3 millimeters and more preferably, less than about 1 millimeter. The corresponding cross sectional areas would be less than about 7 mm².

As shown in FIG. 11, in an alternate embodiment, the sample reservoirs 2 in sample plate 1 would be enclosed by a mat, cover or the like 40, having integrated conduit or tube-like structures 41. The mat footprint would be specific to that of the sample reservoirs 2, so that each tube-like structure 41 on the mat 40 would coincide with a specific sample reservoir 2. With the mat 40 positioned on the sample reservoirs 2, the ends of these tube-like structures 41 would be submerged in the liquid sample 12 inside the reservoir 2. Then when the sampling head 3 was positioned over a sample reservoir 2, and descended upon the reservoir 2 under the mat, it would seal to the mat structure, forming a compression seal 11 of pressure via gas line 7. The sample tube 5 in the head 3 would align with the tube-like structure 41 of the mat 40, to make a longer sample tube 42, which would already be extended into the liquid sample 12. In this manner, the fluidic conduit opening 10 of the fluidic head 3, would not extend into the sample reservoirs 2, rather the conduit tube-like features 42 of the mat 40 would be submerged. The sampling tube 5 would be discreet for the head 3.

The liquid delivery conduit may incorporate in the fluidic head 3 or may partially result in the reservoir 2 as seen in FIG. 11. Example of a sealed well, as shown in FIG. 11A with a traditional barrier seal (friction cap mat, adhesive, or melted seal) on the plate requires piercing or penetrating by the fluidic head. Alternatively an integrated conduit 41 in the well plate or sealing mat, as shown in FIG. 11B, could be sampled from when the fluidic head interfaces to it, as shown in FIG. 11C.

The sample wells may have an integrated seal for preservation, maintaining, protecting or keeping the sample. The seal, mat, cap or cover can be plastic, adhesive, foil, rubber, or the like. The sealing material can be breached by the fluid conduit or by a structure, such as a needle, pin or punch, prior the fluid conduit entering the reservoir. In this case, the fluidic head may have a piercing or penetrating function to breach the barrier or seal and allow the fluidic conduit access to the fluid contained in the well or reservoir.

In an embodiment, the system contains two or more sampling heads, which can work in unison, sampling from adjacent sample wells, or alternatively, can work independently, sampling from different locations. The fluid conduits can either be connected, feeding into one detector, or can be independent, feeding to separate detectors. A sampler could contain one or more sampling heads. A system with multiple sampling heads could seal to separate reservoirs to introduce a sample into a common fluid stream using valving, or alternatively could introduce sample into multiple fluid streams.

The translation of the well positioning may be conducted through use of moving components powers by stepper motors, linear motors, servo motors, DC motors, pneumatic slides, and those alike. Modern translation components in a robotic fluid handling system are capable of positioning faster than 5 seconds.

Positioning of the reservoir to the fluidic head may be accomplished by various xyz motion translational designs know to those of skill in the art. The fluidic head motion could have one or more of the xyz motions. Likewise, the sample reservoir could have one or more of the xyz motions.

The flow path may contain a valve for isolating flow in the fluid path. This will limit the flow in the conduit for the case where the outlet tube has a pressure differing from that the atmospheric pressure or there is height difference (siphoning or backflow effects) between the inlet to the fluid path conduit and the outlet of the conduit. The valve timing may be controlled relative to the pressure change applied to the fluid containing reservoir. The timing may be synchronized with the reservoir pressure change or occur slightly before or after to compensate for system variables such as elasticity of the conduit or inline components.

Either the sample reservoirs 2 or the sampling head 3 may be positioned while the other remains stationary. Alternatively, both the sample reservoirs 2 and the head 3 can be mobile and capable of repositioning. The sample reservoirs 2 may be moved up to meet the head 3, or the head 3 may be moved down to meet the sample reservoirs 2. The sample reservoirs 2 or well plate 1 may be horizontal, vertical or at an angle in orientation. As shown in FIGS. 12A and 12B, the fluidic conduit opening 10 of the sample tube 5 can move independent of the sampling head 3 to fill 100 the fluid conduit 5. While the sample reservoir 2 remains pressurized for gas line 7 with the compression seal 11 intact, the fluidic conduit opening 10 can change heights within the reservoir 2. Here the sampling head remains stationary, and the fluid conduit is lifted in the sample well. The liquid conduit contains liquid 100 until it rises out of the liquid. The controlled pressure in the reservoir then pushes the liquid through the liquid conduit as gas enters fluid conduit. This allows for a gas to be inserted in the fluid conduit without disengaging the fluid head. The reservoir pressure may remain the same or be controlled to a different pressure through the process. The reverse of this process may also take place where the liquid conduit is above the liquid when the vessel is pressurized and subsequently lowered into the liquid 12 resulting in the liquid conduit first receiving gas followed by liquid filling.

The compression seal is non-permanent in nature and can be established by using an o-ring, gasket, polymer-on-polymer, tapered seal, two similar materials or two dissimilar materials. The seal may also be made a corresponding set of shapes that reside in the fluidic head and the reservoir to be sealed. For example a taper seal or a flat bottom to connection.

The gas used to pressurize the sample reservoir may be, but is not limited to, nitrogen, argon, air helium or any combination thereof.

An optical detector may be use which operates with a wavelength between about 200 to about 2000 nanometers.

Figure 13:
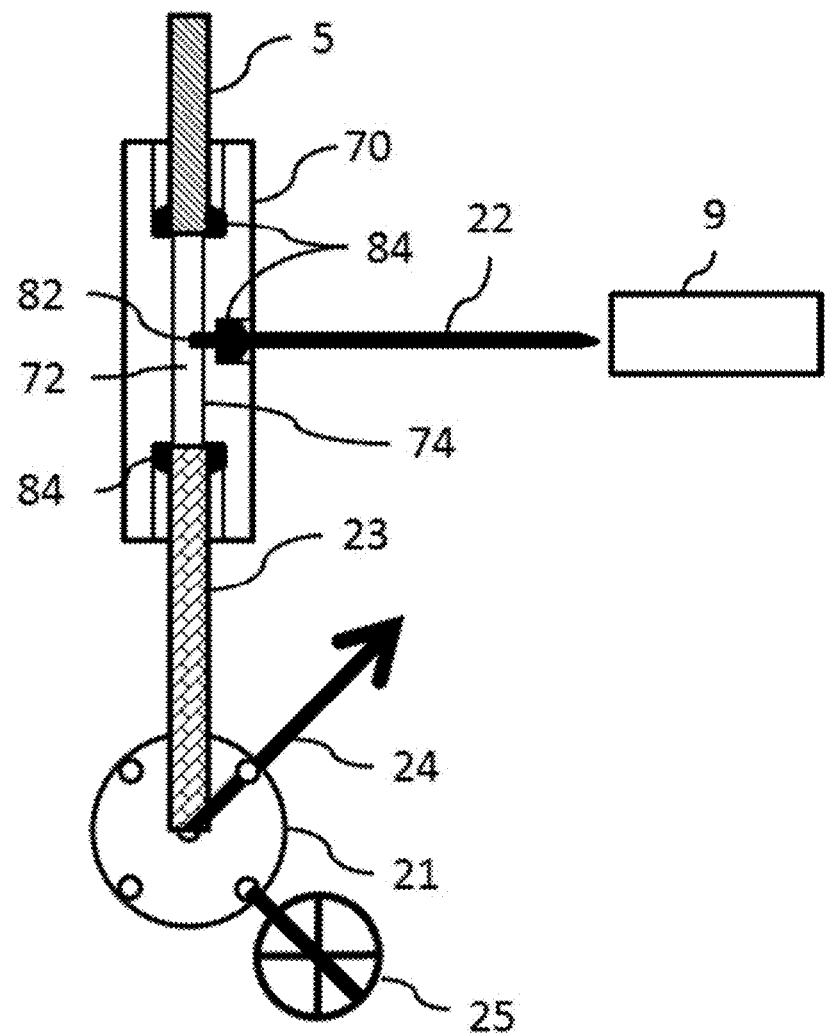
FIG. 13 shows an alternative fluid path branch in the fluid conduit which uses restriction, created by adjusting the inner flow path diameter, to direct fluid flow and the positioning of a tube at or within the boundary of the swept path.

In an alternate embodiment shown in FIG. 13, a flow redirect component 70, such as a "tee", "Y", manifold or the like, is placed in-line with the fluid conduit 5. At one leg, the flow redirect component 70 is connected to a valve 21, and at the other leg, the flow redirect component 70 is connected by a small inner diameter tube or electrospray emitter 22 which is directed to the end delivery location or detector 9. Leak-tight connections to the flow redirect component 70 are made using sealing ferrules 84. The tube or emitter 22 to the detector 9 has a much smaller inner diameter than both the transfer tube 5 connecting the sample well to the flow redirect component 70, and the pathway 23 from the component 70 through the valve 21. Therefore when the valve 21 is in an open position 24, the sample flows freely from the vessel through the redirect component 70 and the valve 21, and through path 24. In the valve 21 open position 24, sample will not easily travel through the small inner diameter tube 22 directed to the detector 9. If the valve 21 is switched to a closed position 25, then an alternate path of higher resistance will be selected. Suitable higher resistance pathway 22 includes a tube, capillary, or emitter with small inner diameter, or alternatively a long length, or the like. The inlet 82 of this pathway 22 that connects to the flow redirect component 70 can be either flush with the boundary 74 of the swept path 72 of the flow redirect component 70, or alternatively, the inlet 82 can protrude past the boundary 74 and into the swept path 72 within the flow redirect component 70. The swept volume is that portion of the flowing volume in a connection directly in the fluid pathway to a flow destination. The dead volume is that portion of the internal volume that is out of the swept volume flow path. The dead volume typically contains fluid that must be purged to avoid sample cross-contamination. The inlet 82 pathway or capillary 22 can enter into the swept path 72 of the flow redirect component 70 at any angle. This embodiment allows for fast sampling with little to no cross-contamination between samples, and consequently avoids the time-consuming wash steps required by conventional samplers where dead volume and geometry changes exist in the flow path. A high resistance pathway 22 can be made by using small inner diameter tubes, long tube lengths, a restriction orifice, or other features known to those skilled in the art.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A fluid sampler system, comprising:
   a fluidic head comprising a gas aperture configured to communicate with a pressurized gas source;
   a conduit comprising an opening at one end;
   a conduit seal disposed around the conduit between the conduit and the fluidic head, wherein the conduit is moveable with respect to the fluid head and the fluidic head is configured to raise the conduit opening above and to submerge the conduit opening below a liquid contained in at least one sample reservoir;
   a compression seal disposed between the fluidic head and the at least one sample reservoir configured to maintain a seal when gas pressure is applied to the at least one sample reservoir through the gas aperture thereby displacing a portion of the liquid through the conduit when the conduit opening is submerged below a liquid contained in the at least one sample reservoir;
   a fluid detector in line with the conduit which measures a desired amount of liquid entering the conduit by detecting a sample flow rate, sample volume or fluid interface;
   a pressure controller in communication with the fluidic head and fluid detector configured to control the pressure of the gas source; and
   a positioning apparatus configured to position the fluidic head and the at least one sample reservoir in communication with one another, wherein the system is configured to isolate a first aliquot of a desired amount from the liquid by submerging the conduit opening in the liquid, controlling the pressure in the least one sample reservoir, and monitoring the filling of the conduit.

2. The system of claim 1, wherein the at least one sample reservoir comprises a well plate, vial, container or reservoir.

3. The system of claim 1, further comprising a second fluid detector in line with the conduit.

4. The system of claim 1, further comprising a sample detector in communication with an output of the conduit.

5. The system of claim 4, wherein the-sample detector comprises a flow injection analysis system, liquid chromatograph, mass spectrometer, or UV detector.

6. The system of claim 1, wherein the positioning apparatus is capable of moving the fluidic head.

7. The system of claim 1, wherein the positioning apparatus is capable of moving to at least one sample reservoir.

8. The system of claim 1, wherein the compression seal is a releasable seal.

9. The system of claim 1, further comprising a flow redirect component comprising a swept path, wherein the flow redirect component is disposed in a flow path between the conduit and a sample detector; and further comprising an electrospray device comprising a fluid entrance disposed in the swept path and an exit in communication with the sample detector.

* * * * *